(12) United States Patent
Radelet

(10) Patent No.: US 6,797,878 B1
(45) Date of Patent: Sep. 28, 2004

(54) CLOSURE CASING

(75) Inventor: Christiaan Radelet, Scherpenheuvel (BE)

(73) Assignee: Tyco Electronics Raychem NV (BE)

( * ) Notice: Subject to any disclaimer, the term of this patent is extended or adjusted under 35 U.S.C. 154(b) by 0 days.

(21) Appl. No.: 09/980,694

(22) PCT Filed: Apr. 18, 2000

(86) PCT No.: PCT/GB00/01504
§ 371 (c)(1),
(2), (4) Date: Oct. 24, 2001

(87) PCT Pub. No.: WO00/65703
PCT Pub. Date: Nov. 2, 2000

(30) Foreign Application Priority Data

Apr. 26, 1999 (GB) .............................................. 9909618
Jun. 24, 1999 (GB) .............................................. 9914752

(51) Int. Cl.[7] ................................................ H02G 3/08
(52) U.S. Cl. ...................... 174/50; 174/17 R; 174/53; 220/3.2; 220/4.02
(58) Field of Search ............................. 174/50, 48, 53, 174/17 R, 65 R, 135, 155, 65 SS, 156, 93, 92; 220/3.2, 3.3, 3.4, 3.8, 4.02; 292/256, 256.69

(56) References Cited

U.S. PATENT DOCUMENTS

| | | | | |
|---|---|---|---|---|
| 2,643,150 A | * | 6/1953 | Giles ...................... | 292/256.69 |
| 3,666,134 A | * | 5/1972 | Rauch ..................... | 174/50 |
| 4,367,569 A | | 1/1983 | Harmon .................... | 24/211 |
| 4,470,623 A | * | 9/1984 | Judge, Jr. ................ | 292/256.75 |
| 4,558,174 A | | 12/1985 | Massey .................... | 174/92 |
| 4,727,629 A | | 3/1988 | Hoen et al. ............... | 24/458 |
| 4,743,209 A | | 5/1988 | Gittle ..................... | 439/521 |
| 5,366,317 A | * | 11/1994 | Solimar ................... | 220/325 |
| 5,524,672 A | | 6/1996 | Mosing et al. ............. | 138/96 |
| 5,631,993 A | * | 5/1997 | Cloud et al. .............. | 385/135 |
| 5,835,658 A | * | 11/1998 | Smith ..................... | 385/135 |
| 6,007,120 A | * | 12/1999 | Vogt et al. ............... | 292/256.69 |
| 6,291,774 B1 | * | 9/2001 | Williams .................. | 174/135 |

FOREIGN PATENT DOCUMENTS

| | | |
|---|---|---|
| EP | 0 546 267 | 9/1992 |
| FR | 2 199 363 | 4/1974 |
| GB | 599354 | 3/1948 |

OTHER PUBLICATIONS

Copy of PCT Search Report for PCT/GB00/01540.
Copy of British Search Report for GB 9909618.2.

* cited by examiner

Primary Examiner—Dean Reichard
Assistant Examiner—Angel R. Estrada
(74) Attorney, Agent, or Firm—Myers Bigel Sibley & Sajovec

(57) ABSTRACT

A closure casing has two co-operating closure members defining an enclosed space between them when in a juxtaposed closed position. A clamp is provided that holds the closure members together in the closed position, the clamp includes at least one over-center or toggle clamp mechanism, one part of which passes through openings in the closure members which are aligned when the closure members are in the closed position, to engage a face of the closure member remote from a second part of the toggle clamp mechanism. The second part is turnable between a clamped position and a release position. At least one of the closure members has a resilient element engageable by a third part of the toggle clamp mechanism and operable to apply a resilient resistance to the clamping movement to hold the clamp mechanism in the clamped position.

26 Claims, 9 Drawing Sheets

CLOSURE CASING

RELATED APPLICATIONS

The present application is a National Phase application of PCT/GB00/01504 filed on Apr. 18, 2000 and published in English, which claims priority from Application GB 9909618.2 filed on Apr. 26, 1999 and Application GB 9914752.2 filed on Jun. 24, 1999.

FIELD OF THE INVENTION

The present invention relates generally to a closure casing, and particularly to a closure casing for enclosing one or more elongate objects such as pipes or cables, which latter term will be understood hereinafter to include both electrically conductive cables and optical cables comprising bundles of optical fibres.

BACKGROUND OF THE INVENTION

Optical fibres are increasingly used in telecommunications systems and a number of techniques have been developed for joining such fibres at particular points within a communications network. Likewise, electrically conductive cables or wires have to be joined at certain places within the network and at all such junctions closure casings are required in order both to support the connection and to provide protection against environmental agencies such as moisture and dust.

Optical fibres may be joined in a number of ways, utilizing techniques such as splicing or devices such as couplers or splitters. A common feature of all such connections, however, is the requirement for a closure casing which has means for allowing ingress of one or a plurality of cables or bundles of fibres at one end and for egress of one or more cables or bundles of fibres at the other. Such closure casings also find particularly utility where it is necessary to install equipment at an intermediate point along a transmission line. Such equipment may, for example, include repeaters, amplifiers, boosters, attenuators or other such equipment (which equipment is mentioned by way of example and is not intended to be an exhaustive list nor to prejudice the generality of the invention) but whatever equipment the closure casing encloses the common features nevertheless remain that the casing must be capable of being sealed against environmental agencies and have sufficient strength and rigidity to resist external forces and protect the, sometimes delicate, components enclosed therein. Such closure casings in use may be buried underground, or housed in cabinets or other locations in the network.

Although such closure casings must be capable of sealing securely against environmental agents it is very often necessary to gain access to the interior of the casing (so-called "re-entry" requirement) in order to make changes to the network or for maintenance purposes in the event of a failure or breakdown. This re-entry requirement means that a closure casing has to be fastened with releasable fasteners of one form or another and cannot be permanently secured such as by adhesive or welding of the components unless it is acceptable for the casing to be disposed of, upon re-entry, and replaced with a fresh casing. Economically, in view of the complexity of the structure, this is usually not viable.

The present invention seeks to provide a closure casing having releasable fasteners for securing the casing parts in the closed condition, and to a fastener for such a closure, which is releasable quickly and easily to allow an operator access to the interior of the closure casing.

One way in which this has been done in the prior art, is to provide the casing with a surrounding ring or clamp which is held in its closure position by an overcentre clamp or toggle latch. WO96/33922 illustrates such a casing. Closure casings in which co-operating parts are held together by toggle clamps are also shown in EP 0 546 267 which describes a clamping closure for closing a cable sleeve having a clamping claw engageable over a flange at the rim of the closure, and U.S. Pat. No. 4,558,174 which describes a closure for a cable splice having mating covers held closed by a continuous wire latch support frame having a plurality of latching fingers which can snap past a centered bistable position into locking engagement with an aligned seat along the closure. A disadvantage with such structures lies in the relatively complex shape of the outside of the closure casing resulting from the presence of the over-centre clamps which makes the casing difficult to handle and requires extra space for it to be housed. Independent over-centre clamps (also known as toggle clamp) are, of course, known as such. One example is described in U.S. Pat. No. 4,367,569, in which it is referred to as a cam locking pin. This has a pivoted pawl at one end, which can be turned to a first position allowing it to be passed through aligned openings in two components to be held together, and a second position in which it resists removal of the pin from the openings. At its opposite end the pin has aligned transverse lugs engageable by a force-applying tool having a pair of hooks removably engageable with the lugs and having respective wedging portions by which tension can be applied to the pin to hold the components together. Disadvantages of this device include the requirement for manual dexterity in manipulating the pivoted pawl, and the fact that this and its associated pivot pin increase the number of components parts of the device and therefor the cost of construction and assembly, as well as the risk of malfunction due to components being out of tolerance.

As used herein the term "toggle clamp" will be understood to relate to a mechanism comprising two parts pivotally engaged or engageable with respect to one another, one of which comprises a tension member and the other of which comprises an operating member or lever. The axis about which the two parts of the clamp are turnable with respect to one another is spaced from an effective point of contact between the operating member or lever and a part of the closure which it engages in use, the arrangement being such that in turning about the pivot axis between the two clamp members from a release position to a clamped position the line of action through the contact point with the closure member is displaced transversely of the line of action between the pivotable connection between the two clamp members and the contact point of the tension member with the other closure member, passing through a "centre" position in which the pivot axis and the said two lines of action are all aligned, at which point the tension applied to the tension member is at its greatest. In the closure position, therefore, the tension applied to the tension member holds the operating lever in its closed position.

The resilience in a toggle clamp mechanism is usually provided by making the tension member of such a material and shape that it can be stressed upon the application of a tensile force between each end or by the provision of a separate spring of the toggle clamp mechanism acting between the tension member and the operating member or lever such that the spring is compressed as the operating lever moves towards its point of maximum compression as the two lines of action are aligned.

SUMMARY OF THE INVENTION

U.S. Pat. No. 4,727,629 discloses a fastener for removably clamping the edges of two panels, each having a hole therethrough. The fastener includes a hinge pin, about which the fastener body pivots.

FR 2,199,363 discloses a toggle clamp for clamping a plate to a support or to another plate. There is no suggestion to use this clamp for closure casings.

GB 599,354 discloses a pin for temporarily securing together sheet metal plates. The pin proper has two legs which can be forced together by a pivotable body member to permit insertion of the pin in holes. The legs can move apart to clamp the plates together.

U.S. Pat. No. 5,524,672 discloses a pipe thread protector having a toroidal body of elastomer with a bore to accept a pipe end and a metal band and a toggle clamp arrangement extending around its periphery.

According to one aspect the present invention provides a closure casing having two co-operating closure members comprising half-shell structures having cable entry ports and defining an enclosed space between them when in a juxtaposed closure position, the closure being provided with holding means for holding the closure members together in the closure position characterised in that the holding means comprises at least one over-centre or toggle clamp. mechanism one part of which passes through openings in the closure members which are aligned when the closure members are in the said closure position, and engages a face of the closure member remote from the other part of the toggle clamp mechanism, which other part is turnable between a clamped position in which tension is applied to the said one part, and a release position.

By passing one of the parts of the toggle clamp mechanism through aligned openings in the closure members it is possible to obtain a number of important benefits. First, unlike conventional toggle clamp mechanisms, the operating lever, and possibly also the tension member, need not project beyond the general outline of the closure casing. This, therefore, makes the outline of the closure casing much less irregular, and protects the operating lever of the toggle clamp mechanism from disturbance or damage by contact with adjacent parts.

Another important advantage lies in the possibility of orientating the toggle clamp mechanism such that the axis about which the two toggle clamp parts are pivotally connected need no longer necessarily be parallel to the closure line between the two closure casing members as has been necessary in the past. Indeed, it is a separate aspect of the present invention to provide a closure casing having two co-operating closure members defining an enclosed space between them when in a juxtaposed closure position, in which there is provided a toggle clamp mechanism having two relatively turnable parts which can be turned in relation to one another about an axis generally transverse the meeting line of the co-operating members of the closure casing.

In a preferred embodiment there may be a plurality of toggle clamps along an extended meeting line between two casing members which may be formed as two half-shells fitting together about co-operating respective perimetral rims.

In a preferred embodiment of the invention at least one of the closure members has a resilient element engageable by a part of the said toggle clamp mechanism and operable to apply a resilient resistance to the clamping movement thereof to hold the clamp in its locking position when moved thereto against the resistance exerted by the resilient element.

Such resilient element may be a laminar resilient strip overlying a surface portion of the casing.

In embodiments of the invention in which the said closure members are co-operating half shells they may be provided with respective flanges around perimetral rims thereof which are brought together when the casing is closed, and in such an embodiment the said resilient element may comprise a strip or stringer lying along the length of at least one flange on one of the casing members.

In such arrangement the flange provided with the resilient strip may have a cavity therein adjacent the opening through which passes the said one part of the toggle clamp mechanism and across which the said resilient strip spans. Alternatively, of course, the resilient strip need not be rectilinear, but provided with an arcuate portion which is stressed towards a rectilinear configuration by the forces applied by the toggle clamp upon closure.

Preferably the said one part of the toggle clamp mechanism has a transverse projection for engaging the face of the closure member remote from the other part of the toggle clamp mechanism. The said transverse projection may be in the form of two oppositely directed substantially symmetrical projections for engaging opposite sides of an opening in the said closure member, or may be in the form of a single hook for engaging one side of a said opening.

In the case of a closure casing having a clam shell configuration in which the two co-operating casing members are half-shells these may have a generally elongate form to define two opposite ends for entry and exit of cables or bundles of optical fibres, and in this case there may be a plurality of toggle clamp mechanisms spaced around at least part of the perimeter of the closure members.

In a preferred embodiment of the present invention the said other part of the toggle clamp mechanism comprises a body portion having two parallel sides with respective aligned openings or cavities for receiving respective pivot pins of the said one member such that the said one member is located, in use, between the said two parallel sides, and an operating tab or lever which projects from the body portion and lies substantially parallel to the surface of the co-operating closure member when the clamp is in its locking position.

Such a configuration allows the clamp to be manipulated manually, without requiring special tools, and this can be further encouraged by the provision on the said body portion of the said other part of the latch mechanism of a face extending generally transversely of the operating tab or lever. This may serve as a release member against which, in use, a force may be applied to release the clamp from its locking position. Of course, in embodiments in which there are a plurality of such clamps, the force applied by each clamp is a fraction of the overall closure force, and this facilitates manual manipulation of the clamps avoiding the requirement for a manipulating tool which may be needed if only a single clamp is provided.

A closure casing according to the invention may further be provided with a sealing member located inwardly of the clamp or clamps for sealing the interior volume of the casing when closed.

According to another aspect of the present invention a closure casing having two co-operating closure members defining an enclosed space between them when in a juxtaposed closure position is provided with closure means in the form of at least one toggle clamp mechanism comprising two relatively turnable parts which can be moved in relation to one another between an over-centre clamping or locking position in which the two parts apply a closing pressure to the two co-operating closure members, and a release position, and in which at least one of the closure members carries a resilient element which is stressed by the toggle clamp mechanism when the parts thereof are in the clamping position whereby to apply a resisting force to maintain the parts of the toggle clamp in their over-centre position and the two closure members pressed against one another.

The present invention also comprehends a toggle clamp mechanism as such, and according to a further aspect of the present invention an over-centre or toggle clamp mechanism for holding together two co-operating members of a closure casing comprises two clamp parts which are pivotally interengaged or interengageable, one clamp part being adapted to pass through aligned openings in the said two co-operating closure members and engage the closure member remote from the other clamp part, the said one clamp part being a unitary member having at least one transverse projection for engagement with the said remote closure member.

The said one clamp part may be turnable about an axis parallel to its length whereby to turn the transverse projection between engagement and release positions with respect to the said remote closure member.

The closure casing of the present invention may be provided with means to resist the release of the or each toggle clamp mechanism.

The means to resist the release of the or each toggle clamp may act to resist movement of the or each toggle clamp from its clamped to its release position.

Alternatively or additionally the means to resist the release of the or each toggle clamp may act to resist the withdrawal of the said one part of the or each toggle clamp through the openings in the closure members.

The means to resist release of the or each toggle clamp may comprise at least one aperture in a part of the toggle clamp mechanism engageable by cooperating removable obstruction means.

Following insertion of the toggle clamp through the openings of the closure members the apertures may receive said removable obstruction means, which may include R-clips, tie wraps, locking wire or padlocks which will provide different levels of security depending on the security requirements.

In another embodiment of the invention at least one of the closure members has a resilient element engageable by a part of the said toggle clamp mechanism and operable to apply a resilient resistance to the clamping movement thereof whereby to hold the clamp in its locking position when moved thereto against the resistance exerted by the resilient element, the said at least one resilient element being relatively displaceable with respect to the adjacent closure member so as to reduce the effective dimensions of the openings, through which a member of the toggle clamp passes whereby to obstruct withdrawal thereof.

When a toggle clamp tension member with an enlarged end is passed through the openings the resilient element can be moved so as to reduce the effective dimensions of the openings to the extent that the enlarged head cannot pass back therethrough. This is very useful in practice to prevent individual toggle clamps becoming dislodged from the casing prior to final securement.

The use of narrow elongate openings with flat hooks is advantageous in securing toggle clamps in a closure member flange of minimum width around the closure without the openings unacceptably weakening the flange.

The resilient element may be retained in a channel formed by at least a part of the closure member, so as to allow longitudinal movement thereof.

The said channel may include at least a part which is not rectilinear so as to apply stress to the resilient element when the channel and resilient element are in a juxtaposed position.

In a preferred embodiment the resilient element is associated with a lower flange and is relatively displaceable therefrom. The relative displacement may be achieved, for example, by the provision of a channel formed by the lower flange. Alternatively or additionally the resilient element may be held in place adjacent the lower flange by the use of fixing means, for example screws or the like and the openings used to accept the screws in the resilient element are elongate such as to allow a degree of movement of the resilient element with respect to the fixing means. Other means for allowing relative displacement of a resilient element with respect to a flange such as magnetic interaction are also not beyond the scope of the invention.

In a further embodiment of the invention the toggle clamp mechanism may have means for engagement by a tool whereby to assist in operating the mechanism.

The said means for engagement by a tool may comprise at least one cavity in the said toggle clamp mechanism.

BRIEF DESCRIPTION OF THE DRAWINGS

Various embodiments of the present invention will now be more particularly described, by way of example, with reference to the accompanying drawings, in which.

BRIEF DESCRIPTION OF THE ILLUSTRATED EMBODIMENTS

Figure 1:
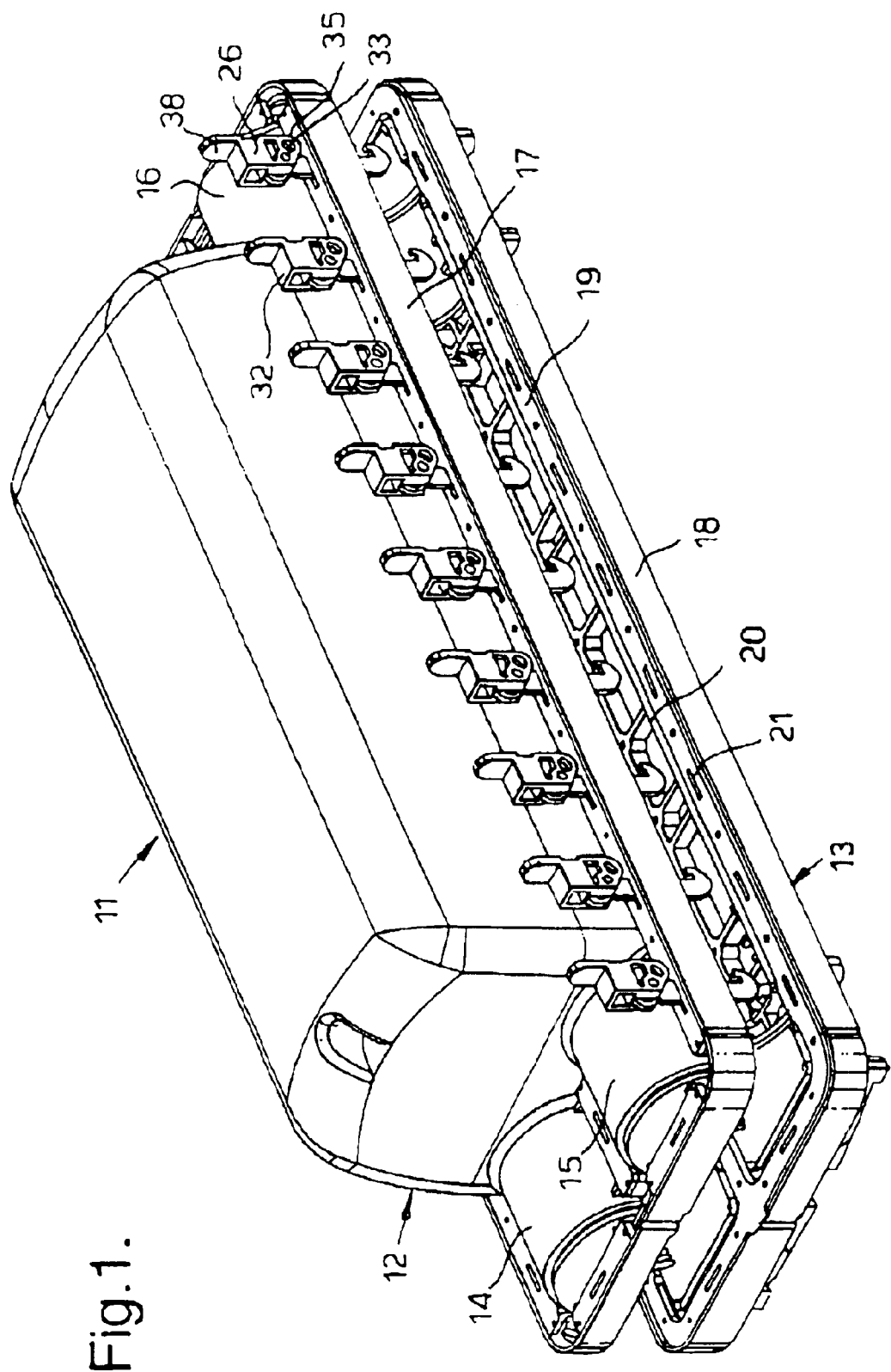
FIG. 1 is a perspective view of a first embodiment of the invention shown with two casing parts separated.
Figure 2:
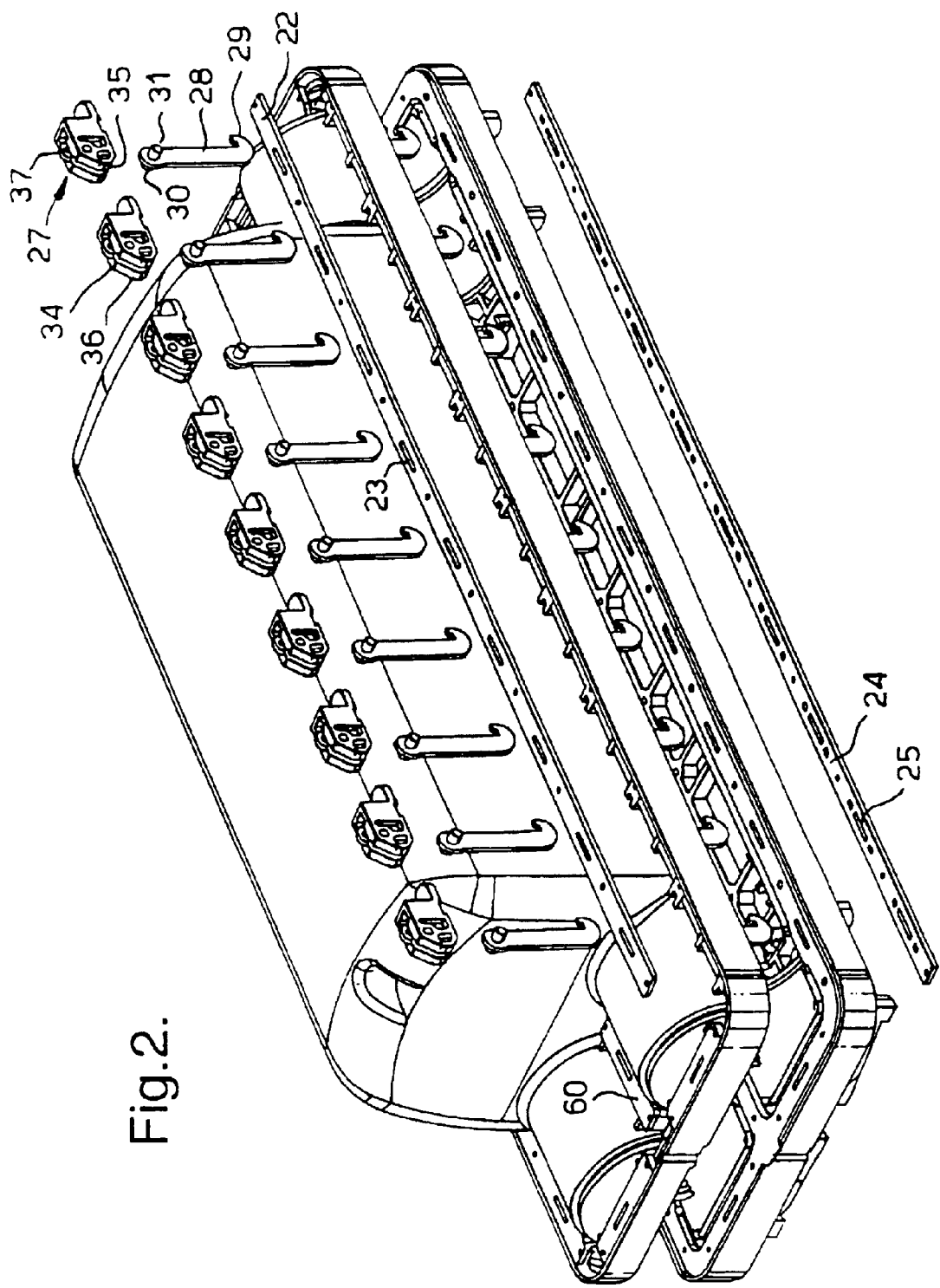
FIG. 2 is a perspective view similar to that of FIG. 1 showing the parts exploded.

Referring first to FIGS. 1 and 2, a fibre optic splice closure casing is generally indicated 11 and comprises an upper casing member 12 and a lower casing member 13. Such splice closure casings are known in themselves and the details thereof will not be described further in except to say that the casing members are respective half-shell structures with part-cylindrical formations 14, 15, 16 at one end defining cable entry ports in co-operation with corresponding structures (not visible in the drawings) in the lower casing member 13 to allow for the introduction of optical fibres into the interior of the casing 11 for splicing, connection by couplers or splitters or the like.

Around the perimeter of the upper casing member 12 extends a perimetral flange 17, there being a corresponding perimetral flange region 18 around the perimeter of the lower casing member 13. Each flange 17, 18 has an approximately rectangular outline comprising two longitudinal rectilinear sides and two transverse rectilinear sides of shorter dimension. For the purposes of the present invention only the nearer longer rectilinear side will be described in detail since the considerations concerning the structure and function of the other sides will be exactly the same. The flange 18 has a face 19 which faces towards the other flange 17 which has a corresponding flat face which is not visible in the drawings. Inwardly from the edge of the flat face 19 is a perimetral seal 20 extending around the flange and co-operating with a similar seal which acts to seal the interior of the closure casing 11 when the two casing members 12, 13 are fitted together with their flanges 17, 18 pressed in contact with one another.

Outwardly of the seal 20 the flange 18 has a plurality of elongate openings 21 spaced along its length and, correspondingly, the upper flange 17 has identical openings which cannot be seen in the drawing.

On the upper face of the flange 17 there is an overlying rectilinear resiliently flexible strip 22 (see FIG. 2) having a corresponding series of slots 23 matching the openings 21 in the flange 18 and the corresponding openings (not shown) in the flange 17. Likewise, on the face of the flange 18 remote from the flange 17 there is an overlying rectilinear resilient strip 24 likewise having slot-like openings 25 in positions which align themselves in register with the openings 21 in the flange 18 when the strip 24 is placed in position. When the members of the closure casing 11 are assembled in the closure position, therefore, the flanges 17, 18 and the rectilinear strips 22, 24 are all positioned closely adjacent to one another with their openings 21, 23 and 25 all in register.

For holding the flanges 17, 18 together there are provided a plurality of over-centre toggle clamps generally indicated 26 each of which is identical and only one of which, therefore, will be described in detail hereinafter. Each toggle clamp 26 comprises two parts, namely a body part 27 and a tension link 28. The tension link 28 comprises a flat generally rectilinear element having a transversely projecting hook 29 at one end. The transverse hook 29 projects in the plane of the link 28 transversely of a line joining its opposite ends.

At its other end the tension link 28 has two transversely projecting spigots 30, 31 defining an axis which is orthogonal both to the length of the tension link 28 and the direction of the transverse projection of the hook 29. The link 28 is substantially rigid and, being rectilinear, substantially inextensible at least in response to the forces likely to be exerted on it in use.

The other part of the toggle clamp mechanism comprises a combined body and operating lever. It comprises a generally cube-like main body portion 32 from which project two parallel flanks 33, 34 having correspondingly curved edges 35, 36. The inwardly facing surfaces of the flanks 33, 34 have sockets or cavities 37 for receiving the transverse spigots 30, 31 of the tension link 28. From the side opposite that from which the parallel flanks 33, 34 project there is an operating tab or lever 38. A face 40 of the body portion 32 extends transversely of operating tab or lever 38.

Figure 3:
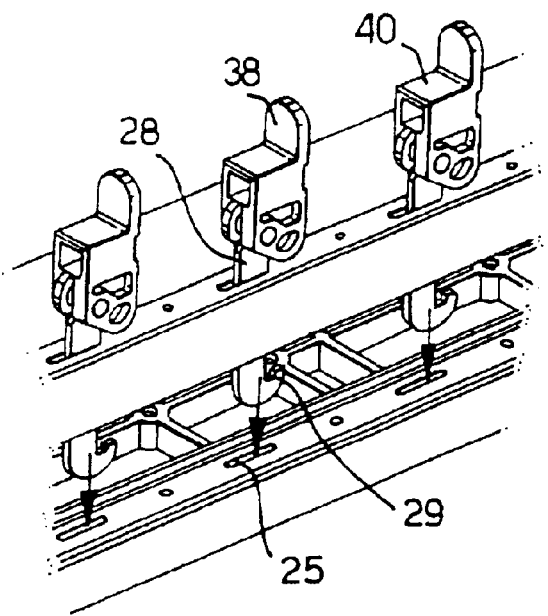
FIGS. 3, 4 and 5 are partial perspective views, on an enlarged scale, showing the operation of the toggle clamps of the embodiments of FIGS. 1 and 2.
Figure 4:
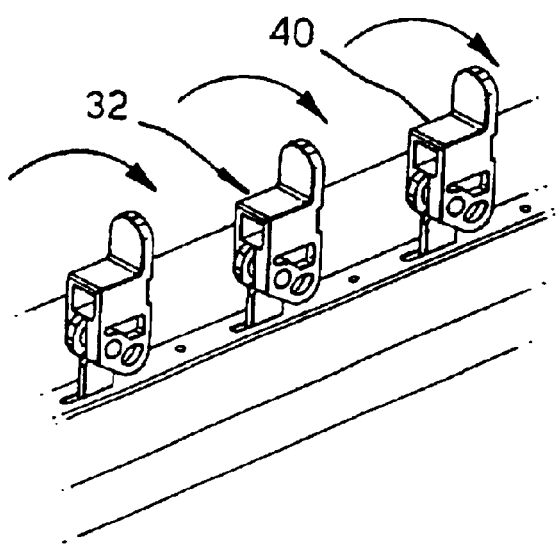
Figure 5:
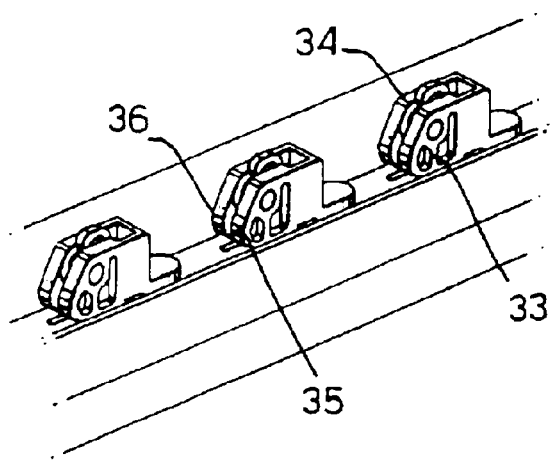

In use the spigots 30, 31 of the tension link 28 are fitted into the cavities or seats 37 and the tension link 28 inserted through the aligned openings 21, 23, 25 as illustrated in FIG. 3, with the body part 27 being orientated such that the operating lever or tab 38 is approximately in line with the tension link 28. Thereafter the body 27 is turned, clockwise as illustrated in FIG. 4, about the inter-engaging pivot between the spigots 30, 31 and the cavities 37 whilst the curved edges 35, 36 are in contact with the upper spring strip 22 and the hook 29 engages the lower spring strip 24. The outline of the curved edges 35, 36 is such that in turning the body 27 between the orientation illustrated in FIG. 4 and that illustrated in FIG. 5, displaced approximately 90° with respect to the former, the mechanism passes through a position in which the pivotal interconnection of the spigots 30, 31 in the cavities is spaced further from the contact point between the edges 35, 36 and the spring strip 22 than is the case on either side of this mid-point such that, having turned the body 27 beyond this point the tension on the tension link 28, exerted by the spring strip 22, 24 in a manner which will be described in more detail below, causes the body 27 to be turned in a clockwise direction as seen in FIGS. 4 and 5, to the clamping position illustrated in FIG. 5. By so turning all the toggle clamps the perimetral flanges of the casing member 12, 13 can be pressed together to seal the closure casing 11 in its closed position. It will be noted that, in particular, the axis about which the toggle clamp body 27 turns in relation to the tension link 28 is perpendicular to the length of the meeting line between the two flanges 17, 18 such that at no time between the fully open and fully closed position does the toggle clamp body 27 project beyond the outline defined by these flanges. To release the clamp 26 the user applies a force to the face 40 thereby urging the body 32 to turn anticlockwise, as claimed in FIGS. 3 to 5, from the position shown in FIG. 5 to that shown in FIG. 4.

Figure 6:
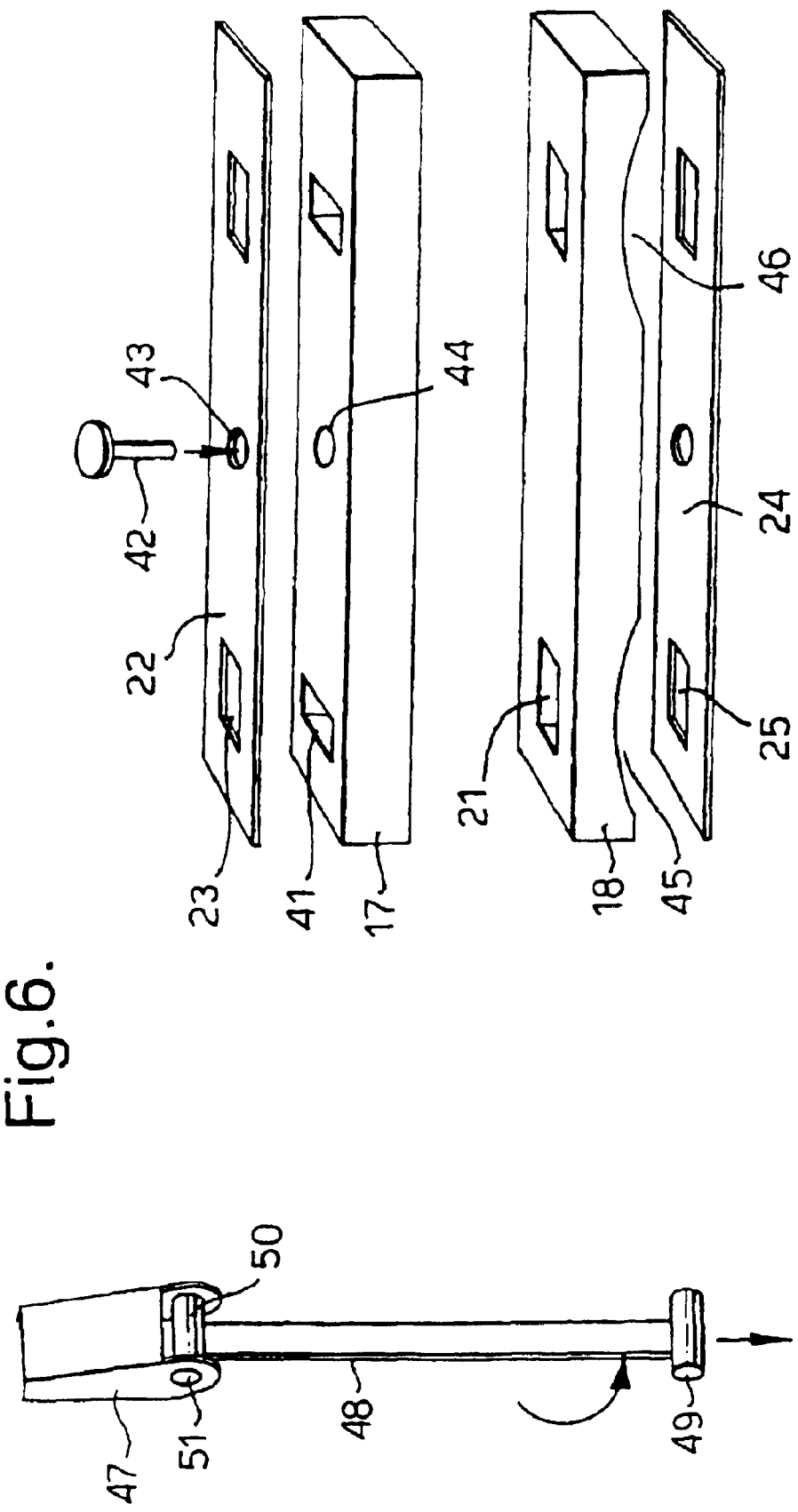
FIG. 6 is a schematic diagram illustrating the components of an alternative toggle clamp of the invention.

The manner in which the spring strips 23, 24 exert their resilient action is described in relation to FIG. 6 which is a schematic representation of a part of a closure casing 11 showing two short sections of the flanges 17, 18, the openings 21 in the lower flange 18 and openings 41 (not previously illustrated in FIGS. 1 to 5) in the upper flange 17.

As can be seen the upper resilient strip 22 is secured in position on the flange 17 by a mounting screw or rivet 42 which passes through a suitably formed hole 43 in the spring strip 23 and into a blind hole 44 in the flange 17. A similar fastening retains the lower spring strip 24 to the face of the flange 18. As can be seen in FIG. 6 the flange 18 is provided with shallow recesses 45, 46 in register with the openings 21 such that there is a small open space between the flange 18 and the strip 24 about each opening 21.

In FIG. 6 a different embodiment of toggle clamp is illustrated from that of FIGS. 1 to 5, comprising a plastics combined toggle clamp body and lever 47 pivotally connected to a tension link 48 in the form of an elongate rod of circular section having two transversely projecting T-shape ends 49, 50 at opposite ends thereof, the latter being engaged in aligned openings 51 in the toggle clamp body 47 to allow pivotal turning movement between the toggle clamp body 47 and the tension link 48.

Upon assembling the casing the T-shape end 49 of the tension link 48 is first introduced through the opening 23 in the spring strip 22, and then turned through 90° to align the T-shape end 49 with the opening 41 in the flange 17, it is then turned back through 90° to allow the T-shape end 49 to pass through the aligned openings 21 and 25 in the flange 18 and the lower spring strip 24. Thereafter the tension link 48, and toggle clamp body 47, are turned through 90° again to orientate the T-shape end 29 transversely with respect to the openings 21, 25 to engage this end against the under face of the spring strip 25. On turning the toggle clamp body 47 about the axis defined by the pivot 51 tension is applied to the tension link 48 in the known way, causing the spring strip 24 to flex into the cavity 45 thereby applying a restoring force to hold the toggle clamp 47 in its clamping position and also to accommodate dimensional variation due to manufacturing tolerances in the components.

Figure 7C:
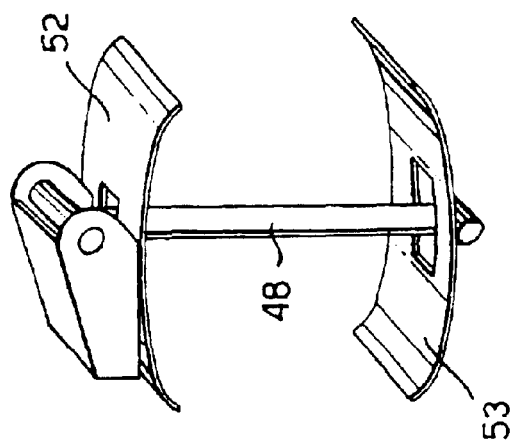
FIGS. 7a, 7b and 7c are three figures showing a further alternative embodiment of toggle clamp.
Figure 7B:
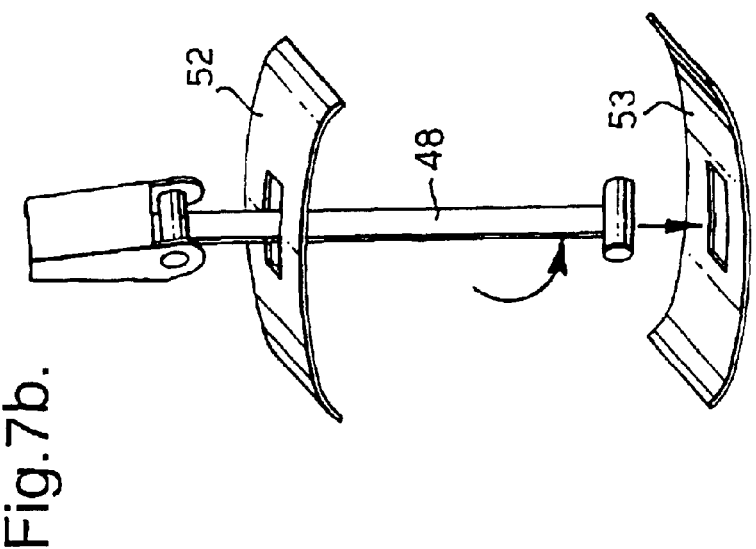
Figure 7A:
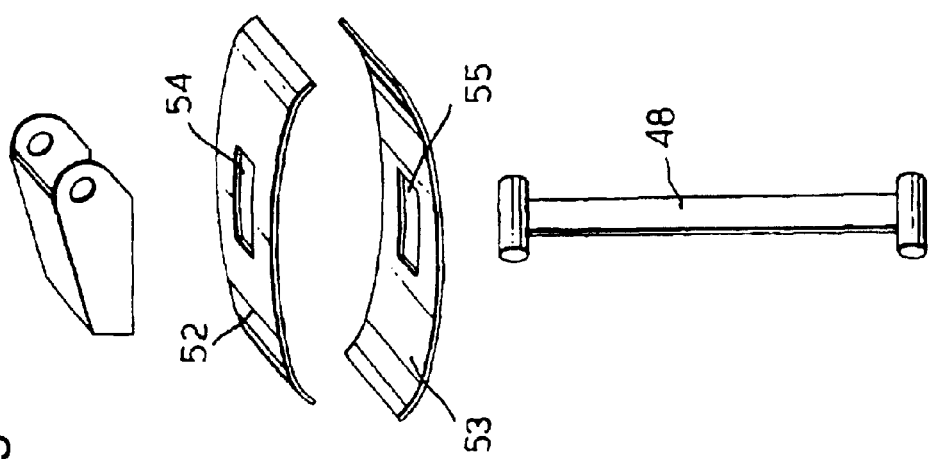

FIGS. 7a, 7b and 7c show a similar toggle clamp structure to that illustrated in FIG. 6, but in which the resilient forces are exerted not by spring strips 22, 24 but by curved resilient springs 52, 53 having central openings 54, 55 through which the tension link 48 can be passed. Such a toggle clamp is particularly useful in confined positions, for example at the ends of the casing 11 or between the two cable entry ports 14, 15 where there is the short narrow space indicated 60 in FIG. 2. Because the tension link 22 passes through aligned openings in cooperating members it is not necessary to have components of the toggle clamp passing beyond the perimeters of the flanges, which allows the toggle clamp to be located in the position 60 illustrated in FIG. 2 where a conventional toggle clamp would not be usable.

Figure 8:
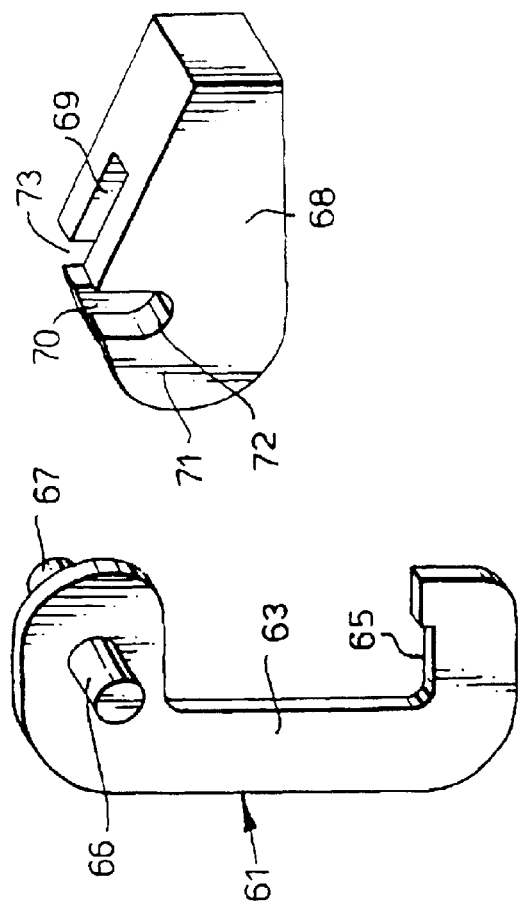
FIG. 8 is a schematic exploded diagram illustrating the components of a further embodiment of toggle clamp.
Figure 8:
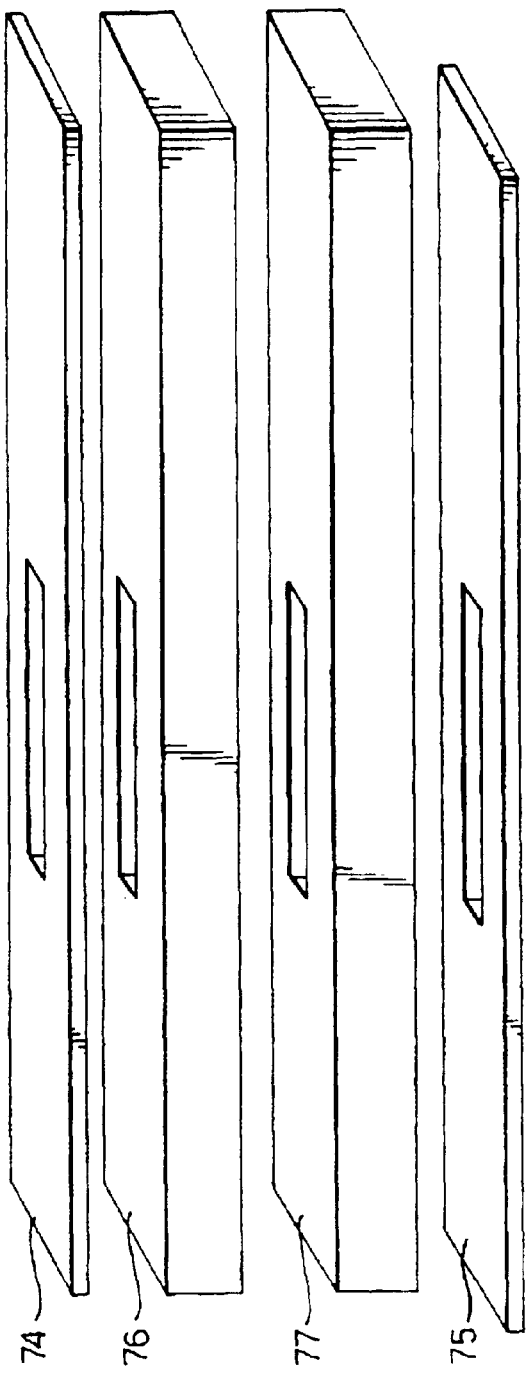

FIG. 8 illustrates an alternative embodiment of toggle clamp in which a tension link 61 is formed as a generally C-shape member with a bight portion 63 and two opposite arms 64, 65 the former of which carries transverse spigots 66, 67 and the latter of which constitutes the hook end for engagement of one of the closure casing members. The toggle clamp body comprises a single block 68 having a slot 69 defining two parallel flanks 70, 71 in which are formed two open ended U-shaped slots 72, 73 for receiving the transverse spigots 66, 67. As in the previous embodiments the resilience for retaining the toggle clamp in its closure position is provided by spring strips 74, 75 lying against opposite faces of the mating flanges 76, 77, shown schematically in FIG. 8 as part only of the overall flange. Alternatively, however, the C-shape tension member 61 may have a degree of resilience allowing bending of the bight portion 63 to provide the degree of resilience needed for operation of the toggle clamp.

Figure 9:
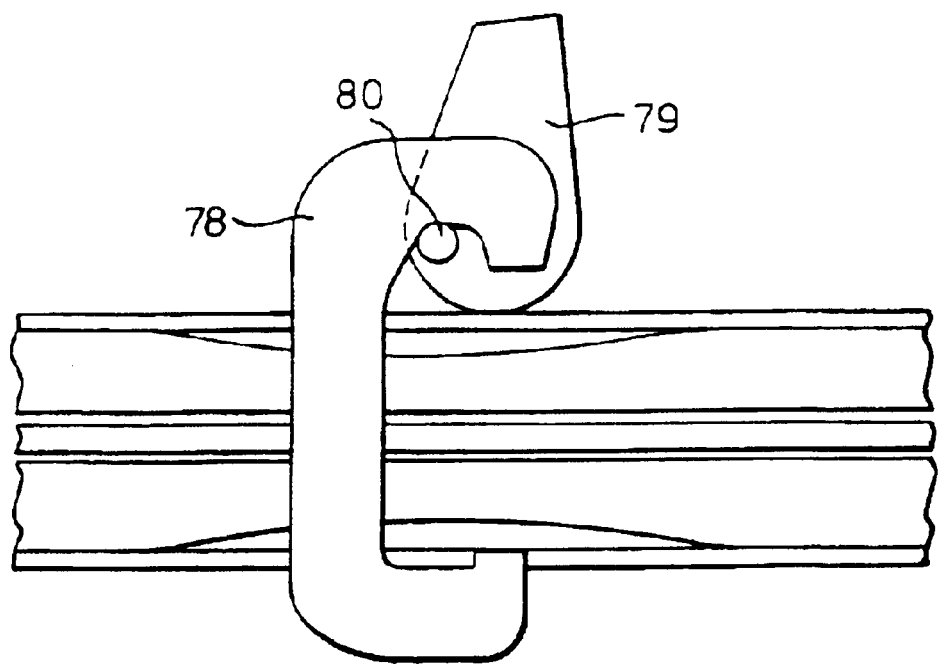
FIGS. 9 and 10 are two schematic sectional views illustrating a further embodiment of the invention.
Figure 10:
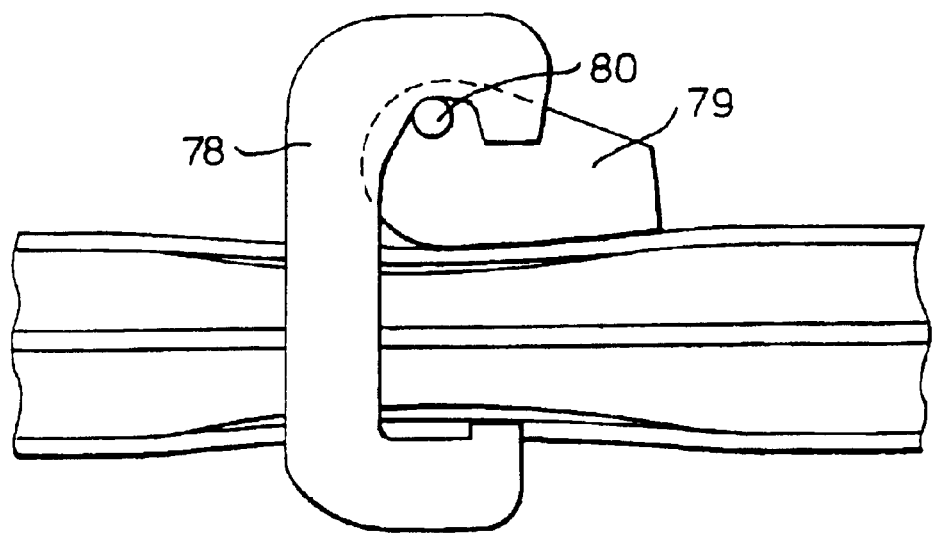
Figure 11:
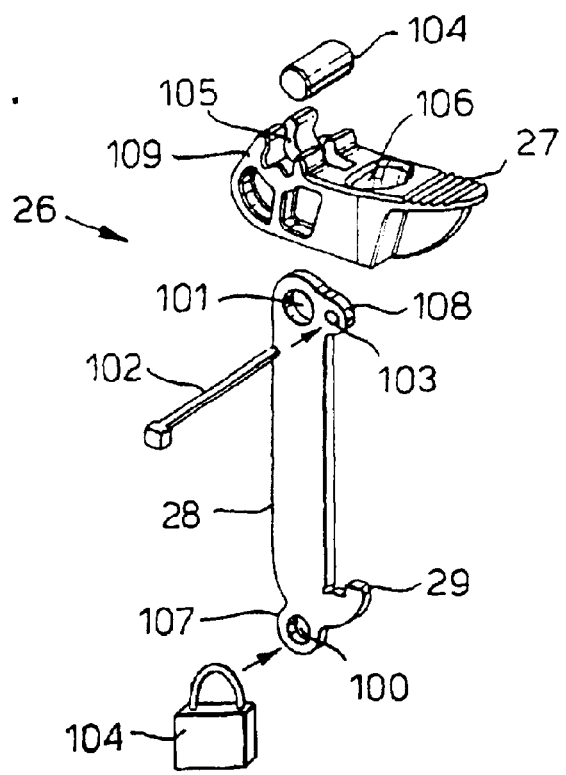
FIG. 11 is a perspective view of a toggle clamp mechanism formed as a further embodiment of the invention, shown with the parts of the mechanism separated.
Figure 12:
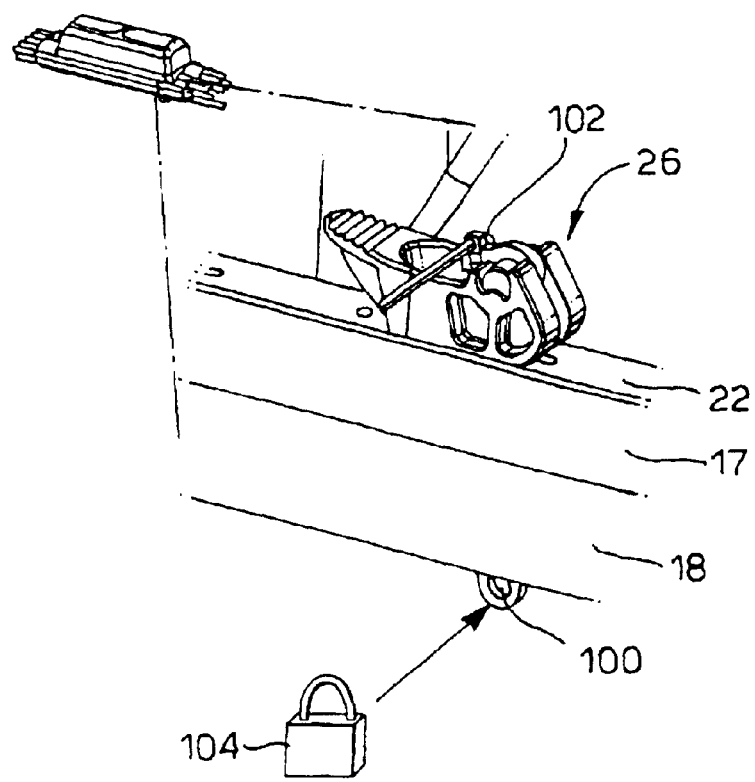
FIG. 12 is an enlarged perspective view of the toggle clamp shown in FIG. 1 shown in use in a closure casing.

FIGS. 9 and 10 illustrate a further embodiment of the invention in which the tension link 78 is in the form of a flat C-shape member and the toggle clamp body 79 has a slot spanned by a pin 80 for engaging one arm of the C-shape member 78. FIGS. 9 and 10 also illustrate the flexing of the resilient strips such as the strips 74, 75 in the embodiment of FIG. 8 or the strips 22, 24 in the embodiment of FIGS. 1 and 2. Referring now to FIGS. 11 and 12 there is shown a toggle clamp generally indicated 26 comprising two main parts, namely a body part 27 and a tension link 28 interconnected by a main pivot pin 104 which passes through an opening 101 in the end of the tension link 28 and is cradled in aligned cavities 105 in two arms 109 of the body part 27. The tension link 28 is a flat generally rectilinear element having a transversely projecting hook 29 at its lower end, at which there is an ear 107 with an aperture 100. At its other end the tension link 28 has a second ear 108 with an aperture 103.

In use of the toggle clamp the aperture 100 at the lower end of the tension link 28 is exposed, as shown in FIG. 12, beyond the flange 18 and can be engaged by removable obstruction means shown in the drawings as a padlock 104.

The second aperture 103 in the ear 108 at the upper end (as seen in FIG. 11) of the tension link 28 is positioned so as to protrude from the top of the body part 27 when the toggle clamp is closed and may receive an obstructing member 102 which in the drawings is illustrated as a tie wrap.

The body part 27 also has a cavity 106 in its upper surface which may be used to assist in locking or unlocking of the toggle clamp 26 by inserting an elongate member (not shown) for use as a lever.

Figure 13:
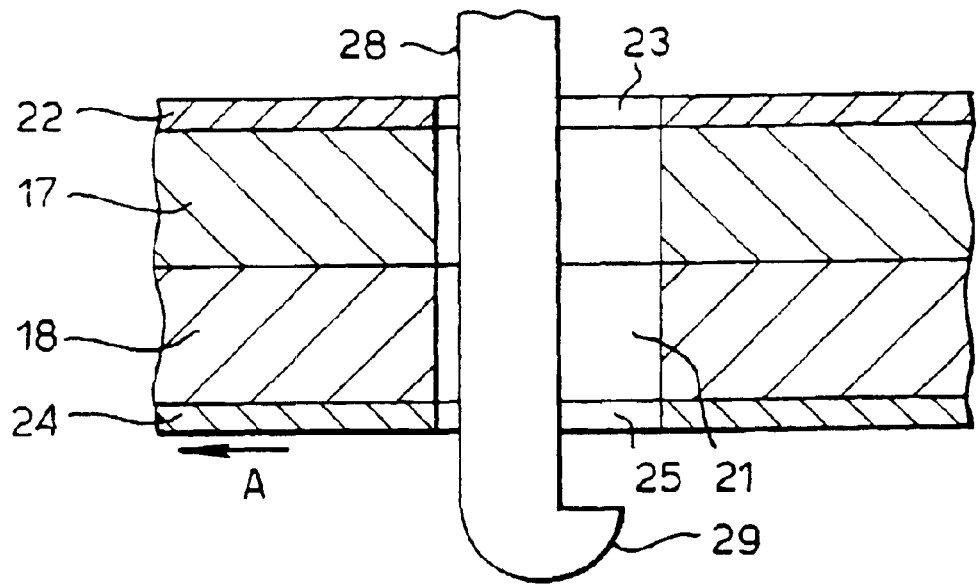
FIG. 13 is a schematic diagram illustrating the slidable resilient element of a second embodiment of the invention in a first position.
Figure 14:
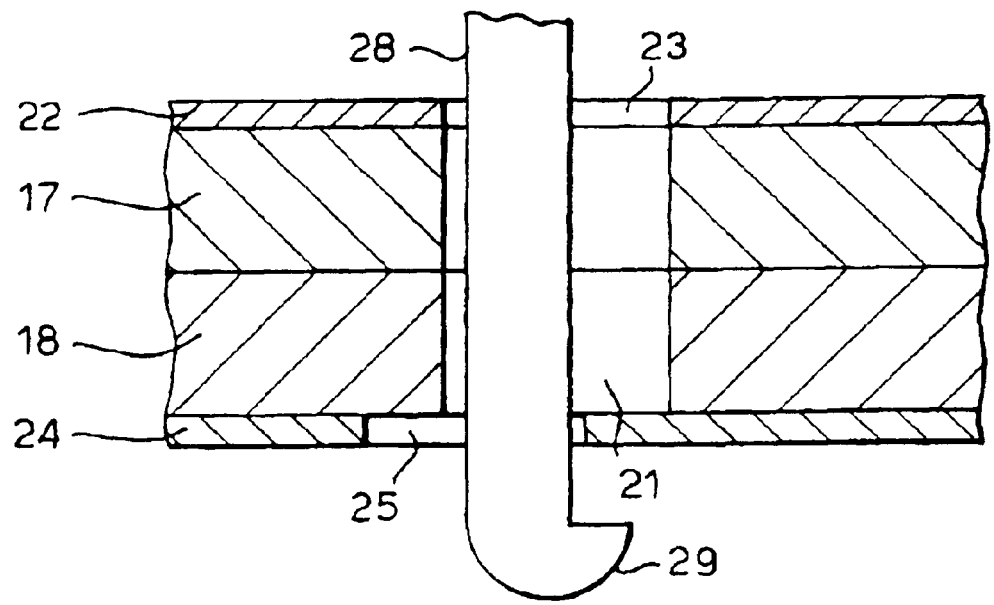
FIG. 14 is a schematic diagram illustrating the slidable resilient element of the second embodiment in a second position.

Referring now to FIGS. 13 and 14 there is shown a tension link 28 of a toggle clamp (not shown) which has been inserted through elongate slots 21, 23 and 25 of spring strips 22, 24 and flange 18.

In use the openings 21, 23 and 25 are normally in register allowing introduction of the tension link 28 as shown in FIG. 13. Thereafter the spring strip 24 is moved in the direction shown by the arrow A in FIG. 13 to the position shown in FIG. 14; this has the effect of decreasing the effective width of the opening 25 therethrough. This prevents the hook 29 from passing back through the opening 25 and helps to retain the toggle clamp in position prior to closure of the clamp.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A closure casing comprising:

two co-operating closure members having half-shell structures and having cable entry ports and defining an enclosed space between the closure members when in a juxtaposed closed position;

a clamp that holds the closure members together in the closed position;

wherein the clamp comprises at least one over-centre or toggle clamp mechanism, a first part of which passes through openings in the closure members which are aligned when the closure members are in the closed position, and engages a face of one of the closure members remote from a second part of the toggle clamp mechanism, which second part is turnable between a clamped position in which tension is applied to the first part and a release position; and wherein a pivotal interconnection of the second part of the toggle clamp mechanism to the first part of the toggle clamp mechanism has a rotational midpoint spaced further from an engagement point of the toggle clamp mechanism with the face of one of the closure members than on either side of the rotational midpoint.

2. A closure casing according to claim 1, wherein at least one of the closure members has a resilient element engageable by said toggle clamp mechanism and operable to apply a resilient resistance to hold the clamp mechanism in the clamped position when the toggle clamp mechanism is moved to the clamped position against a resistance exerted by the resilient element.

3. A closure casing according to claim 2 wherein the resilient element comprises a laminar resilient strip overlying a surface portion of the casing.

4. A closure casing according to claim 3 wherein said closure members comprise co-operating half shells having respective flanges around perimetral rims thereof, which rims are brought together when the casing is closed, and wherein said resilient element comprises a strip and/or stringer lying along the length of at least one of the flanges.

5. A closure casing according to claim 4, wherein the flanges have a cavity therein adjacent the openings in the closure members across which said resilient strip spans.

6. The closure of claim 2 wherein the toggle clamp mechanism contacts the resilient element.

7. A closure casing according to claim 1, wherein the first part of the toggle clamp mechanism has a transverse projection configured to engage the face of the closure member remote from the second part of the toggle clamp mechanism.

8. A closure casing according to claim 7 wherein there are a plurality of openings in the flanges of the closure members and a plurality of toggle clamp mechanisms spaced around at least part of a periphery of the closure members.

9. A closure casing according to claim 7, wherein said transverse projection comprises a hooked end of the first part configured to engage said face of the closure member remote from the second part of the clamp mechanism.

10. A closure casing according to claim 1 wherein said second part of the toggle clamp mechanism comprises a body portion having two parallel flanges with respective aligned openings or cavities for receiving respective pivot pins of the first part such that the first part is located between the two parallel flanges, and an operating tab and/or lever that lies substantially parallel to a surface of one of the co-operating closure members when the toggle clamp mechanism is in the clamped position.

11. A closure casing according to claim 1 wherein there are a plurality of toggle clamps spaced along at least part of a perimeter of the casing and further comprising a sealing member located inwardly of the toggle clamps that seal the interior volume of the casing in the clamped position.

12. A closure casing according to claim 1, further comprising means to resist release of the toggle clamp mechanism.

13. A closure casing according to claim 12, wherein the means to resist release of the toggle clamp mechanism acts to resist movement of the second part of the toggle clamp mechanism from its clamped to its release position.

14. A closure casing according to claim 12 wherein the means to resist release of the toggle clamp mechanism resists withdrawal of the first part through the openings in the closure members.

15. A closure casing according to claim 14, wherein the means to resist release of the toggle clamp mechanism comprises at least one aperture in a member of the toggle clamp mechanism engageable by cooperating removable obstruction means for obstructing removal of the toggle clamp mechanism from the openings.

16. A closure casing according to claim 1, wherein the toggle clamp mechanism has means for engagement by a tool whereby to assist in turning the second part of the toggle clamp mechanism.

17. A closure casing according to claim 16, wherein said means for engagement by a tool comprises at least one cavity in the second part of the toggle clamp mechanism.

18. The closure of claim 1 wherein the first part of the toggle clamp mechanism comprises a generally rectilinear element.

19. The closure of claim 18 wherein the first part of the toggle clamp mechanism is substantially flat.

20. The closure of claim 1 wherein at least one toggle clamp mechanism is positioned on an end of the closure members having the cable entry ports.

21. A closure casing comprising:

two co-operating closure members having half-shell structures and having cable entry ports and defining an enclosed space between the closure members when in a juxtaposed closed position;

a clamp that holds the closure members together in the closed position;

wherein the clamp comprises at least one over-centre or toggle clamp mechanism, a first part of which passes through openings in the closure members which are aligned when the closure members are in the closed position, and engages a face of one of the closure members remote from a second part of the toggle clamp mechanism, which second part is turnable between a clamped position in which tension is applied to the first part and a release position;

wherein said second part of the toggle clamp mechanism comprises a body portion having two parallel flanges with respective aligned openings or cavities for receiving respective pivots pins of the first part such that the first part is located between the two parallel flanges, and an operating tab and/or lever that lies substantially parallel to a surface of one of the co-operating closure members when the toggle clamp mechanism is in the clamped position; and wherein said body portion of the second part of the toggle clamp mechanism has a face extending generally transversely of the operating tab and/or lever and serving as a release member against which is applied a force to release the toggle clamp mechanism from the clamped position.

22. A closure casing comprising:

two co-operating closure members having half-shell structures and having cable entry ports and defining an enclosed space between the closure members when in a juxtaposed closed position;

a clamp that holds the closure members together in the closed position;

wherein the clamp comprises at least one over-centre or toggle clamp mechanism, a first part of which passes through openings in the closure members which are aligned when the closure members are in the closed position, and engages a face of one of the closure members remote from a second part of the toggle clamp mechanism, which second part is turnable between a clamped position in which tension is applied to the first part and a release position;

wherein at least one of the closure members has a resilient element engageable by said toggle clamp mechanism and operable to apply a resilient resistance to hold the clamp mechanism in the clamped position when the toggle clamp mechanism is moved to the clamped position against a resistance exerted by the resilient element; and wherein said at least one resilient element is relatively displaceable with respect to an adjacent one of the closure members so as to reduce the effective dimensions of the openings through which the first part of the toggle clamp mechanism passes whereby to obstruct withdrawal thereof.

23. A closure casing according to claim 22 wherein said resilient element is retained in a channel which allows longitudinal movement of the resilient element.

24. A closure casing according to claim 23, wherein said channel includes at least a part which is not rectilinear so as to apply stress to the resilient element when the channel and resilient element are in a juxtaposed position.

25. A closure casing comprising:

two co-operating closure members having half-shell structures and having cable entry ports and defining an enclosed space between the closure members when in a juxtaposed close position;

a clamp that holds the closure members together in the closed position;

wherein the clamp comprises at least one over-centre or toggle clamp mechanism, a first part of which passes through openings in the closure members which are aligned when the closure members are in the closed position, and engaging a face of one of the closure members remote from a second part of the toggle clamp mechanism, which second part is turnable between a clamped position in which tension is applied to the first part and a release position; and wherein the first part of the toggle clamp mechanism comprises an elongate rod having a T-shaped end.

26. A closure casing comprising:

two co-operating closure members having half-shell structures and having cable entry ports and defining an enclosed space between the closure members when in a juxtaposed closed position;

a clamp that holds the closure members together in the closed position;

wherein the clamp comprises at least one over-centre or toggle clamp mechanism, a first part of which passes through openings in the closure members which are aligned when the closure members are in the closed position, and engages a face of one of the closure members remote from a second part of the toggle clamp mechanism, which second part is turnable between a clamped position in which tension is applied to the first part and a release position; and wherein the clamp does not project beyond an outline defined by the closure members in the closed position or the release position.

\* \* \* \* \*

UNITED STATES PATENT AND TRADEMARK OFFICE
CERTIFICATE OF CORRECTION

PATENT NO. : 6,797,878 B1
DATED : September 28, 2004
INVENTOR(S) : Radelet

It is certified that error appears in the above-identified patent and that said Letters Patent is hereby corrected as shown below:

Column 13,
Line 15, should read -- a juxtaposed closed position; --
Line 23, should read -- position, and engages a face of one of the closure --

Signed and Sealed this

Seventh Day of June, 2005

JON W. DUDAS
*Director of the United States Patent and Trademark Office*